(12) United States Patent
Kambara et al.

(10) Patent No.: US 9,065,294 B2
(45) Date of Patent: Jun. 23, 2015

(54) CONTROL DEVICE, POWER USAGE CONTROL SYSTEM AND CONTROL METHOD

(75) Inventors: Hironori Kambara, Osaka (JP); Yukiya Higuchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 535 days.

(21) Appl. No.: 13/519,449

(22) PCT Filed: Dec. 1, 2010

(86) PCT No.: PCT/JP2010/071467
§ 371 (c)(1),
(2), (4) Date: Jun. 27, 2012

(87) PCT Pub. No.: WO2011/080986
PCT Pub. Date: Jul. 7, 2011

(65) Prior Publication Data
US 2012/0296485 A1 Nov. 22, 2012

(30) Foreign Application Priority Data

Dec. 28, 2009 (JP) ................................. 2009-297358

(51) Int. Cl.
*G05D 23/00* (2006.01)
*G05D 17/00* (2006.01)
(Continued)

(52) U.S. Cl.
CPC ............... *H02J 3/14* (2013.01); *H02J 13/0017* (2013.01); *H02J 2003/143* (2013.01);
(Continued)

(58) Field of Classification Search
CPC .............. G05D 23/1917; G05D 23/19; G05D 23/1902; G05D 23/1919; G05D 23/1904; G05D 23/1923; G05D 23/1932; G05D 23/1927; G05D 23/00; G05D 1/0027; G05D 1/0212; G05D 23/01; G05D 23/1905; G05D 23/2434
USPC .................................................. 700/276–278
See application file for complete search history.

(56) References Cited

U.S. PATENT DOCUMENTS 4,090,062 A * 5/1978 Phillips et al. ................. 219/486
4,918,615 A * 4/1990 Suzuki et al. ................. 700/275
(Continued)

FOREIGN PATENT DOCUMENTS

JP 9-252533 A 9/1997
JP 10-509274 A 9/1998
(Continued)

OTHER PUBLICATIONS

International Search Report issued in PCT/JP2010/071467, mailed on Mar. 1, 2011, 2 pages.

*Primary Examiner* — Robert Fennema
*Assistant Examiner* — Thomas Stevens
(74) *Attorney, Agent, or Firm* — Birch, Stewart, Kolasch & Birch, LLP

(57) ABSTRACT

A control device includes a storage device storing reference power, basic device point information showing a control priority representing a degree for determining a control order of a plurality of devices, and room information showing a priority of each room in which the plurality of devices are disposed; an acquisition unit acquiring power usage of the plurality of devices; a changing unit changing the basic device point information based on the room information; a determination unit determining whether or not the acquired power usage has exceeded the reference power; and a transmitting unit transmitting, to a device of the plurality of devices that is relatively high in control priority after change, an instruction to reduce the power usage of this device, based on determination that the acquired power usage has exceeded the reference power.

10 Claims, 13 Drawing Sheets

(51) Int. Cl.
  *H02J 3/14* (2006.01)
  *H02J 13/00* (2006.01)

(52) U.S. Cl.
  CPC ........... *Y02B 70/3225* (2013.01); *Y04S 20/222* (2013.01); *Y02B 70/3266* (2013.01); *Y02B 90/2607* (2013.01); *Y04S 20/242* (2013.01); *Y04S 40/12* (2013.01)

(56) References Cited

U.S. PATENT DOCUMENTS

| | | | | |
|---|---|---|---|---|
| 5,071,065 | A | * | 12/1991 | Aalto et al. ................ 236/49.3 |
| 5,385,297 | A | * | 1/1995 | Rein et al. .................... 236/49.3 |
| 5,682,949 | A | * | 11/1997 | Ratcliffe et al. ............. 165/209 |
| 5,812,422 | A | | 9/1998 | Lyons |
| 5,950,709 | A | * | 9/1999 | Krueger et al. .............. 165/11.1 |
| 7,276,815 | B2 | * | 10/2007 | Algrain et al. .................. 307/80 |
| 7,738,999 | B2 | * | 6/2010 | Petite ............................ 700/295 |
| 2003/0073461 | A1 | * | 4/2003 | Sinclair .......................... 455/557 |
| 2005/0043860 | A1 | * | 2/2005 | Petite ............................ 700/291 |
| 2005/0086324 | A1 | * | 4/2005 | Jeong ............................ 709/217 |
| 2005/0116542 | A1 | * | 6/2005 | Kihara et al. ................... 307/29 |
| 2006/0033625 | A1 | * | 2/2006 | Johnson et al. ............. 340/573.1 |
| 2008/0185448 | A1 | * | 8/2008 | Kim et al. ........................ 236/51 |
| 2009/0018706 | A1 | * | 1/2009 | Wittner ......................... 700/295 |
| 2010/0298991 | A1 | * | 11/2010 | Alonso Sadaba et al. .... 700/276 |

FOREIGN PATENT DOCUMENTS

| | | |
|---|---|---|
| JP | 2000-137534 A | 5/2000 |
| JP | 2008-253103 A | 10/2008 |
| JP | 2009-130974 A | 6/2009 |

\* cited by examiner

FIG.2

| DEVICE | BASIC POINT | | | ADJUSTMENT POINT DURING OPERATION OF AIR CONDITIONER |
|---|---|---|---|---|
| | NORMAL MODE | | VISITOR MODE | |
| | PRESENCE | ABSENCE | | |
| AIR CLEANER211 | 2200 | 2300 | 2000 | — |
| LIGHTING APPARATUS212 | 1300 | 1500 | 1200 | — |
| TELEVISION221 | 1500 | 2300 | 1400 | — |
| AIR CONDITIONER222 | 2000 | 2200 | 1800 | −(ROOM TEMPERATURE − SETTING TEMPERATURE)×100 |
| LIGHTING APPARATUS223 | 1300 | 1500 | 1100 | — |
| TELEVISION231 | 1400 | 1600 | 1300 | — |
| IH COOKER232 | — | — | — | — |
| REFRIGERATOR233 | — | — | — | — |
| LIGHTING APPARATUS234 | 1400 | 1600 | 1400 | — |
| PC241 | 1700 | 2000 | 1700 | — |
| AIR CONDITIONER242 | 1800 | 2000 | 1600 | −(ROOM TEMPERATURE − SETTING TEMPERATURE)×100 |
| LIGHTING APPARATUS243 | 1400 | 1600 | 1400 | — |

| DEVICE | BASIC POINT | | ADJUSTMENT POINT DURING OPERATION OF AIR CONDITIONER | ROOM |
|---|---|---|---|---|
| | NORMAL MODE | VISITOR MODE | | |
| | PRESENCE | ABSENCE | | | |

| DEVICE | PRESENCE | ABSENCE | VISITOR MODE | ADJUSTMENT POINT DURING OPERATION OF AIR CONDITIONER | ROOM |
|---|---|---|---|---|---|
| AIR CLEANER211 | 2200 | 2300 | 2000 | — | JAPANESE-STYLE ROOM910 |
| LIGHTING APPARATUS212 | 1300 | 1500 | 1200 | — | JAPANESE-STYLE ROOM910 |
| TELEVISION221 | 1500 | 2300 | 1400 | — | LIVING ROOM920 |
| AIR CONDITIONER222 | 2000 | 2200 | 1800 | −(ROOM TEMPERATURE − SETTING TEMPERATURE)×100 | LIVING ROOM920 |
| LIGHTING APPARATUS223 | 1300 | 1500 | 1100 | — | LIVING ROOM920 |
| TELEVISION231 | 1400 | 1600 | 1300 | — | KITCHEN930 |
| IH COOKER232 | — | — | — | — | KITCHEN930 |
| REFRIGERATOR233 | — | — | — | — | KITCHEN930 |
| LIGHTING APPARATUS234 | 1400 | 1600 | 1400 | — | KITCHEN930 |
| PC241 | 1700 | 2000 | 1700 | — | BEDROOM940 |
| AIR CONDITIONER242 | 1800 | 2000 | 1600 | −(ROOM TEMPERATURE − SETTING TEMPERATURE)×100 | BEDROOM940 |
| LIGHTING APPARATUS243 | 1400 | 1600 | 1400 | — | BEDROOM940 |

| ROOM | ROOM POINT | |
| --- | --- | --- |
| | PRESENCE | ABSENCE |
| JAPANESE-STYLE ROOM910 | −400 | −300 |
| LIVING ROOM920 | −800 | −100 |
| KITCHEN930 | −600 | −200 |
| BEDROOM940 | −200 | −50 |

FIG.6

| DEVICE | BASIC POINT | | | ADJUSTMENT POINT DURING OPERATION OF AIR CONDITIONER |
|---|---|---|---|---|
| | NORMAL MODE | | VISITOR MODE | |
| | PRESENCE | ABSENCE | | |
| AIR CLEANER211 | 1800 | 2000 | 2000 | — |
| LIGHTING APPARATUS212 | 900 | 1200 | 1200 | — |
| TELEVISION221 | 700 | 2200 | 1400 | — |
| AIR CONDITIONER222 | 1200 | 2100 | 1800 | −(ROOM TEMPERATURE − SETTING TEMPERATURE) ×100 |
| LIGHTING APPARATUS223 | 500 | 1400 | 1100 | — |
| TELEVISION231 | 800 | 1400 | 1300 | — |
| IH COOKER232 | — | — | — | — |
| REFRIGERATOR233 | — | — | — | — |
| LIGHTING APPARATUS234 | 800 | 1400 | 1400 | — |
| PC241 | 1500 | 1950 | 1700 | — |
| AIR CONDITIONER242 | 1600 | 1950 | 1600 | −(ROOM TEMPERATURE − SETTING TEMPERATURE) ×100 |
| LIGHTING APPARATUS243 | 1200 | 1550 | 1400 | — |

FIG.10

| DEVICE | BASIC POINT | ADJUSTMENT POINT DURING ABSENCE | ADJUSTMENT POINT FOR VISITOR PRESENCE | ADJUSTMENT POINT DURING OPERATION OF AIR CONDITIONER |
|---|---|---|---|---|
| AIR CONDITIONER | 2000 | +400 | −400 | −(ROOM TEMPERATURE − SETTING TEMPERATURE)×100 |
| LIGHTING APPARATUS | 1300 | +400 | −200 | — |

| DEVICE | BASIC POINT | ADJUSTMENT POINT DURING ABSENCE | ADJUSTMENT POINT FOR VISITOR PRESENCE | ADJUSTMENT POINT DURING OPERATION OF AIR CONDITIONER | ROOM |
|---|---|---|---|---|---|
| AIR CONDITIONER | 2000 | +400 | −400 | −(ROOM TEMPERATURE − SETTING TEMPERATURE) × 100 | WESTERN-STYLE ROOM |
| LIGHTING APPARATUS | 1300 | +400 | −200 | − | JAPANESE-STYLE ROOM |

| DEVICE | BASIC POINT | ADJUSTMENT POINT DURING ABSENCE | ADJUSTMENT POINT FOR VISITOR PRESENCE | ADJUSTMENT POINT DURING OPERATION OF AIR CONDITIONER |
|---|---|---|---|---|
| AIR CONDITIONER | 1700 | +400 | −400 | −(ROOM TEMPERATURE − SETTING TEMPERATURE) × 100 |
| LIGHTING APPARATUS | 800 | +400 | −200 | − |

24A ntrol Device, Power Usage Control System and Control Method

TECHNICAL FIELD

The present invention relates to a control device, a power usage control system and a control method, and particularly to a control device limiting power usage in the user's premises, a power usage control system provided with the control device, and a control method for the control device.

BACKGROUND ART

Conventionally known is a power demand control device by which, when the power usage of a plurality of devices has exceeded the contracted power amount, the power supply is shut down starting from the device higher in demand process priority order as a shutdown priority order, to execute a demand process. Japanese Patent Laying-Open No. 09-252533 (PTL 1) discloses a device as the above-mentioned power demand control device. This device sets a device address and a demand process priority order by the same and individual switch means for each device. Then, when the power usage exceeds the contracted power amount, the device individually shuts down the power of the devices in descending priority order in accordance with the demand process priority order set by the switch means before shutting down all of the plurality of devices by the entire breaker.

CITATION LIST

Patent Literature

PTL 1: Japanese Patent Laying-Open No. 09-252533

SUMMARY OF INVENTION

Technical Problem

However, according to the power demand control device in PTL 1, when the user wants to preferentially use a certain room, it is necessary to raise the demand process priority order of each device in this certain room in order to avoid power shutdown of each device in this room (particularly, the device used by the user).

In other words, the user should perform the operation to raise the demand process priority order for each device in the room preferentially used by the user.

The present invention has been made in light of the above-described problems. An object of the present invention is to provide a control device, a power usage control system and a control method that allow limitation on the power usage in the user's premises in consideration of the room's priority.

Solution to Problem

According to an aspect of the present invention, a control device controlling an operation of each of a plurality of devices connected to house wiring includes a storage device storing reference power, device priority information showing a control priority representing a degree for determining a control order of the plurality of devices and room priority information showing a priority of each room in which the plurality of devices are disposed; an acquisition unit acquiring power usage of the plurality of devices; a changing unit changing the control priority based on the room priority information; a determination unit determining whether or not the acquired power usage has exceeded the reference power; and a transmitting unit transmitting, to a device of the plurality of devices that is relatively high in control priority after change, an instruction to reduce the power usage of the device, based on determination that the acquired power usage has exceeded the reference power.

Preferably, the storage device further stores power consumption information showing predetermined power consumption during an operation for each device. The determination unit includes a calculation unit calculating a difference between the acquired power usage and the reference power. The control device further includes an identification unit identifying at least one or more devices to which the instruction is transmitted, based on the control priority after change, the difference and the power consumption information, when the acquired power usage has exceeded the reference power; and a generation unit generating the instruction for each identified device.

Preferably, the control device further includes a first receiving unit receiving presence status information showing a status of human presence in each room from a human detection sensor disposed in each room. The control priority includes a control priority during presence representing a degree for determining the control order in a case where a human is present in the room in which the devices are disposed, and a control priority during absence representing a degree for determining the control order in a case where a human is absent in the room. The changing unit changes the control priority during presence and the control priority during absence based on the room priority information. When the presence status information shows presence of a human in the room, the identification unit identifies the device to which the instruction is transmitted, based on the control priority obtained after changing the control priority during presence by the changing unit. When the presence status information shows absence of a human in the room, the identification unit identifies the device to which the instruction is transmitted, based on the control priority obtained after changing the control priority during absence by the changing unit.

Preferably, the control device further includes an accepting unit accepting an input of visitor information showing that a visitor is scheduled to come. The control priority further includes a control priority for visitor presence representing a degree for determining the control order in a case where a visitor is scheduled to come. The changing unit changes the control priority for visitor presence based on the room priority information. When the accepting unit accepts the input of the visitor information, the identification unit identifies the device to which the instruction is transmitted, based on the control priority obtained after changing the control priority for visitor presence by the changing unit.

Preferably, the room priority information includes priority information during presence showing the priority in a case where a human is present in the room and priority info nation during absence showing the priority in a case where a human is absent in the room. The changing unit changes the control priority during presence using the priority information during presence, and changes the control priority during absence using the priority information during absence. When the presence status information shows presence of a human in the room, the identification unit identifies the device to which the instruction is transmitted, based on the control priority changed using the priority information during presence. When the presence status information shows absence of a human in the room, the identification unit identifies the device to which the instruction is transmitted, based on the control priority changed using the priority information during absence.

Preferably, the control device further includes a first receiving unit receiving presence status information showing a status of human presence in each room from a human detection sensor disposed in each room. When the presence status information shows presence of a human in the room, the changing unit changes the control priority based on the room priority information and information predetermined in accordance with the presence status information.

Preferably, the control device further includes an accepting unit accepting an input of visitor information showing that a visitor is scheduled to come. When the input showing that the visitor is scheduled to come is accepted, the changing unit changes the control priority based on the room priority information and information predetermined in accordance with the visitor information.

Preferably, at least one of the plurality of devices is an air conditioner. The control device further includes a second receiving unit receiving setting condition information showing a setting condition of a room in which the air conditioner is installed, and environmental information showing an environment of the room under the setting condition. The changing unit changes the control priority based on the room priority information, the setting condition information and the environmental information.

According to another aspect of the present invention, a power usage control system includes a control device controlling an operation of each of a plurality of devices connected to house wiring, and the plurality of devices. The control device includes a storage device storing reference power, device priority information showing a control priority representing a degree for determining a control order of the plurality of devices, and room priority information showing a priority of each room in which the plurality of devices are disposed; an acquisition unit acquiring power usage of the plurality of devices; a changing unit changing the control priority based on the priority information; a determination unit determining whether or not the acquired power usage has exceeded the reference power; and a transmitting unit transmitting, to a device of the plurality of devices that is relatively high in control priority after change, an instruction to reduce the power usage of the device, based on determination that the acquired power usage has exceeded the reference power. In response to reception of the instruction, the plurality of devices each perform an operation based on the instruction.

According to still another aspect of the present invention, a control method for a control device for controlling an operation of each of a plurality of devices connected to house wiring includes the steps of: a processor of the control device storing, in a memory of the control device, reference power, device priority information showing a control priority representing a degree for determining a control order of the plurality of devices and room priority information showing a priority of each room in which the plurality of devices are disposed; the processor acquiring power usage of the plurality of devices; the processor changing the control priority based on the priority information; the processor determining whether or not the acquired power usage has exceeded the reference power; and the processor transmitting, to a device of the plurality of devices that is relatively high in control priority after change, an instruction to reduce the power usage of the device, based on determination that the acquired power usage has exceeded the reference power.

Advantageous Effects of Invention

According to the control device, the power usage control system and the control method, the power usage in the user's premises can be limited in consideration of the room's priority.

BRIEF DESCRIPTION OF DRAWINGS

FIG. 2 is a diagram showing device point information stored in a control device.

FIG. 4 is a diagram showing the basic device point information stored in the control device.

FIG. 5 is a diagram showing the room information stored in the control device.

FIG. 6 is a diagram showing the post-change device point information stored in the control device.

FIG. 10 is a diagram showing the device point information for obtaining a basic point during absence and a basic point for visitor presence by an operation.

FIG. 11 is a diagram showing the basic device point information for obtaining the basic point during absence and the basic point for visitor presence by an operation.

FIG. 13 is a diagram showing post-change device point information.

DESCRIPTION OF EMBODIMENTS

Figure 1:
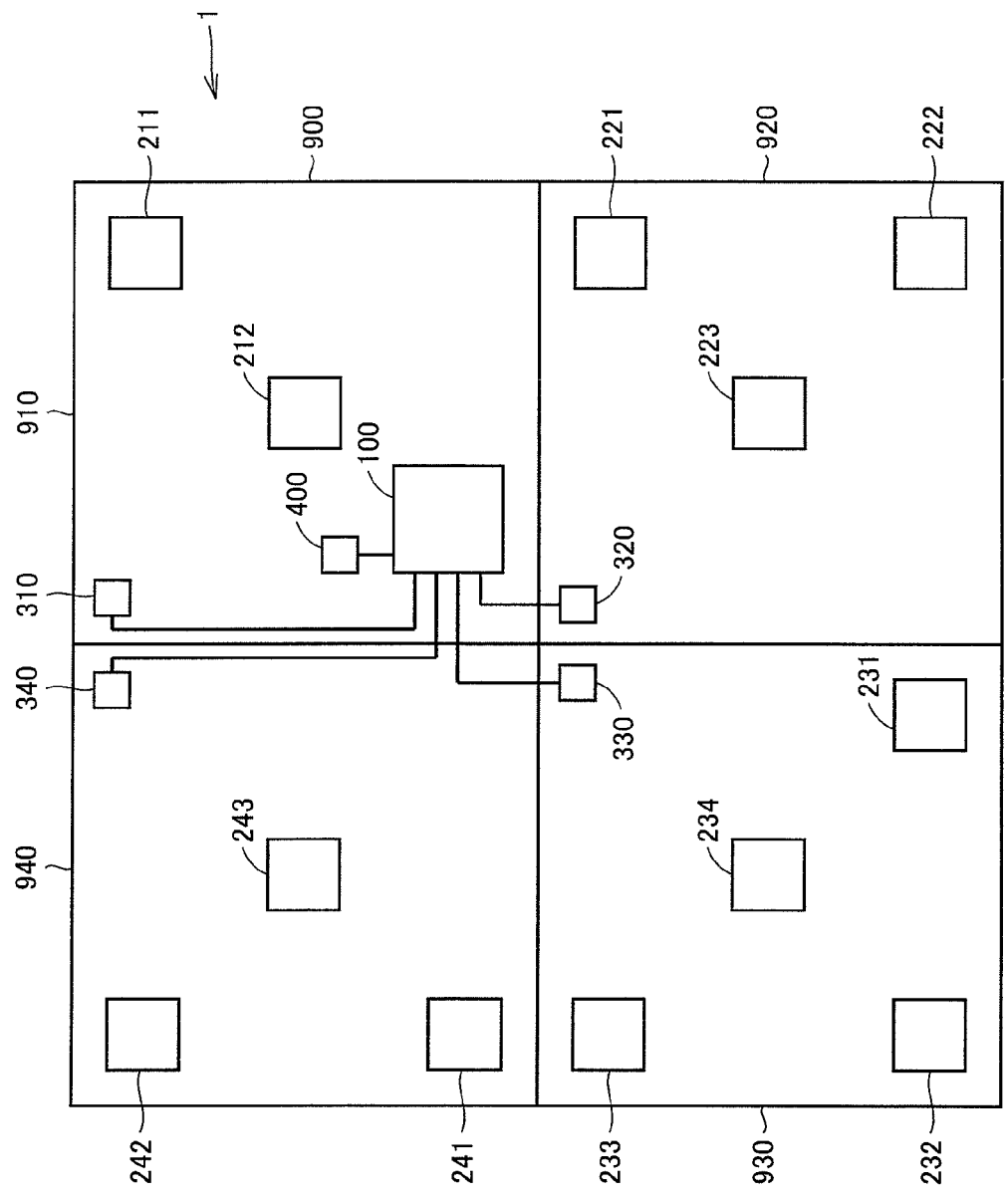
FIG. 1 is a diagram showing an outline of a power usage control system.

Hereinafter described will be a control device and a power usage control system including the control device according to the embodiments of the present invention with reference to the accompanying drawing. In the following description, the same components are designated by the same reference characters. Names and functions thereof are also the same. Accordingly, the detailed description thereof will not be repeated.

<Outline of System>

FIG. 1 is a diagram showing the outline of a power usage control system 1 according to the present embodiment. Power usage control system 1 serves to control power demand (demand). Referring to FIG. 1, power usage control system 1 is used within a house 900 (in the user's premises). House 900 includes a Japanese-style room 910, a living room 920, a kitchen 930, and a bedroom 940.

Power usage control system 1 includes a control device 100, a plurality of devices 211, 212, 221 to 223, 231 to 234, 241 to 243 that are to be controlled by control device 100, human detection sensors 310, 320, 330, and 340, and an electric energy meter 400. The plurality of devices 211, 212, 221 to 223, 231 to 234, and 241 to 243 are connected to the house wiring of house 900. It is to be noted that the plurality of devices 211, 212, 221 to 223, 231 to 234, and 241 to 243 will also be referred to as a "user-premises device group".

Control device 100, electric energy meter 400, human detection sensor 310, an air cleaner 211, and a lighting apparatus 212 are disposed in Japanese-style room 910. Human detection sensor 320, a television 221, an air conditioner 222, and a lighting apparatus 223 are disposed in living room 920. Human detection sensor 330, a television 231, an IH (Induction Heating) cooker 232, a refrigerator 233, and a lighting apparatus 234 are disposed in a kitchen 930. Human detection sensor 340, a PC (Personal Computer) 241, an air conditioner 242, and a lighting apparatus 243 are disposed in a bedroom 940.

Although the present embodiment will provide an example in which control device 100 and electric energy meter 400 are arranged in Japanese-style room 910, the room having control device 100 and electric energy meter 400 arranged therein is not limited to Japanese-style room 910. For example, control device 100 and electric energy meter 400 may be disposed within a room such as kitchen 930, an entrance space (not shown) and a box-room (not shown) or on the outer wall of house 900.

Control device 100 is connected to electric energy meter 400 in a wired manner. Furthermore, control device 100 is connected in a wired manner to human detection sensors 310, 320, 330, and 340 in each room. Furthermore, control device 100 is communicatively connected to the above-described user-premises device group wirelessly, for example, via a wireless LAN (Local Area Network).

In addition, control device 100 may be wirelessly connected to electric energy meter 400 and human detection sensors 310, 320, 330, and 340. Furthermore, control device 100 may be connected to the above-described user-premises device group in a wired manner.

Human detection sensors 310, 320, 330, and 340 detect whether or not a human is present in Japanese-style room 910, living room 920, kitchen 930, and bedroom 940, respectively. Human detection sensors 310, 320, 330, and 340 each transmit, to control device 100, the presence status information showing the status of human presence in the room.

Electric energy meter 400 measures the power usage of the above-described user-premises device group. More specifically, electric energy meter 400 measures the power used in house 900 in real time. Electric energy meter 400 is, for example, a smart meter.

Control device 100 acquires the above-described power usage from electric energy meter 400. Furthermore, control device 100 acquires the operation status of each device. For example, control device 100 acquires the information via the above-described wired or wireless communication as to whether or not each device is operating. Furthermore, control device 100 receives the above-described presence status information from human detection sensors 310, 320, 330, and 340. Control device 100 controls the operation of the above-described user-premises device group based on the power usage and the presence status information. The details of control by control device 100 will be described later.

<Control Example 1 of Control Device 100>

FIG. 2 is a diagram showing the device point information stored in control device 100. Referring to FIG. 2, in device point information 29, at least the basic point in the normal mode and the basic point in the visitor mode are associated with each device (specifically, identification information of each device). Furthermore, in the normal mode, the basic points are associated with each device separately for the cases of human presence and human absence.

For each of air conditioners 222 and 242, the adjustment point during operation of the air conditioner is associated. The basic points are not associated with IH cooker 232 and refrigerator 233. In this case, control device 100 recognizes IH cooker 232 and refrigerator 233 each as a device that is not to be controlled.

For example, when the user inputs a basic point into control device 100, the basic point is stored in control device 100. Alternatively, control device 100 may receive the point stored in each device from each device and store the received point as a basic point. Furthermore, control device 100 may be configured such that the point received by control device 100 from each device can be changed by the user.

Hereinafter described will be the outline of the process by control device 100 in the case where device point information 29 is used.

When the power usage of the above-described user-premises device group has exceeded the reference power which will be described later, control device 100 transmits, to a device having a relatively high control priority representing a degree for determining the control order, an instruction to reduce the power usage of this device based on device point information 29. In this case, the control priority is shown by the basic point and the adjustment point during operation of the air conditioner. Since control device 100 does not need to issue this instruction to the device that is not operating, the device is recognized as not being controlled. Then, control device 100 performs the process described later. The control order will be hereinafter specifically described.

First explained will be the case where control device 100 is in the normal mode. Also, an explanation will be given with regard to the case were a human is not present in Japanese-style room 910 and bedroom 940 while a human is present in living room 920 and kitchen 930. In addition, as described above, control device 100 determines based on the signals from human detection sensors 310, 320, 330, and 340 as to whether a human is present or not in each room.

In this case, for each of air cleaner 211 and lighting apparatus 212 in Japanese-style room 910, and PC 241, air conditioner 242 and lighting apparatus 243 in bedroom 940, control device 100 determines the control order based on the basic point during human absence. Also, for each of television 221, air conditioner 222 and lighting apparatus 223 in living room 920, and television 231 and lighting apparatus 234 in kitchen 930, control device 100 determines the control order based on the basic point during human presence.

Furthermore, as for air conditioner 222 and air conditioner 242, control device 100 subtracts the point (adjustment point) obtained by multiplying the difference between the current room temperature and the setting temperature by 100 as a constant from the basic point used for determining the control order. As for air conditioner 222 and air conditioner 242, control device 100 determines the control order based on the point obtained by subtracting the adjustment point from this basic point. For example, it is assumed that air conditioner 222 is in the operating state and the room temperature in living room 920 having air conditioner 222 disposed therein is 28° C. while the setting temperature is 25° C. In addition, it is also assumed that air conditioner 242 is not operating.

In such a case, the points used for determining the control order of each device are assigned as follows: specifically, "2300" for air cleaner 211, "1500" for lighting apparatus 212, "1500" for television 221, "1700" for air conditioner 222 that is obtained by subtracting adjustment point 300 from basic point 2000, "1300" for lighting apparatus 223, "1400" for television 231, "1400" for lighting apparatus 234, "2000" for PC 241, and "1600" for lighting apparatus 243. Air conditioner 242 is not to be controlled.

Control device 100 determines based on the above-described points that the higher point the device has, the higher the control order of the device is. Specifically, control device 100 sets air cleaner 211 having a point of "2300" as the first in the control order.

In this case, control device 100 sends an instruction to air cleaner 211 to reduce the power usage of air cleaner 211. In response to reception of the instruction, air cleaner 211 stops operating, for example.

After a lapse of a prescribed time period after control device 100 sends the instruction to air cleaner 211 to reduce its power usage, control device 100 again determines whether or not the power usage of the above-described user-premises device group has exceeded the reference power which will be described later.

When the power usage of the above-described user-premises device group has not exceeded the reference power, control device 100 again continues to monitor whether or not the power usage of the above-described user-premises device group has exceeded the reference power. On the other hand, when the power usage of the above-described user-premises device group still has exceeded the reference power described later, control device 100 sends an instruction to reduce the power usage to PC 241 having the second highest point. In this case, PC 241 sends an instruction to shift to a sleep mode, for example. Alternatively, PC 241 turns off the power supply when any application is not started up.

After a lapse of a prescribed time period after control device 100 sends the instruction to PC 241 to reduce the power usage, control device 100 again determines whether or not the power usage of the above-described user-premises device group has exceeded the reference power which will be described later. Control device 100 continues such a process until the power usage of the above-described user-premises device group stops exceeding the reference power.

As described above, power usage control system 1 can control the power usage of the user-premises device group to be not more than the reference power. It is to be noted that the reference power is, for example, contracted power that is contracted with the electric power company (the power based on the maximum demanded power throughout a year). Alternatively, the reference power is power obtained by multiplying the contracted power by a prescribed proportion (proportion less than 100%).

Control device 100 may also be configured as described below. Specifically, a command for directly controlling the operation of the device itself may be transmitted to each device as an instruction to reduce the power usage. For example, control device 100 may be configured like a remote controller of each device to directly transmit, to each device, a command for turning off the power supply, a command for instructing temperature setting, and a command for switching the operation mode. In this case, it is necessary for control device 100 to store a program and the like, in advance, for operating this control device 100 as a remote controller for each device.

The visitor mode will be described in "<Control Example 2 of Control Device 100>" described later.

<Hardware Configuration>

Figure 3:
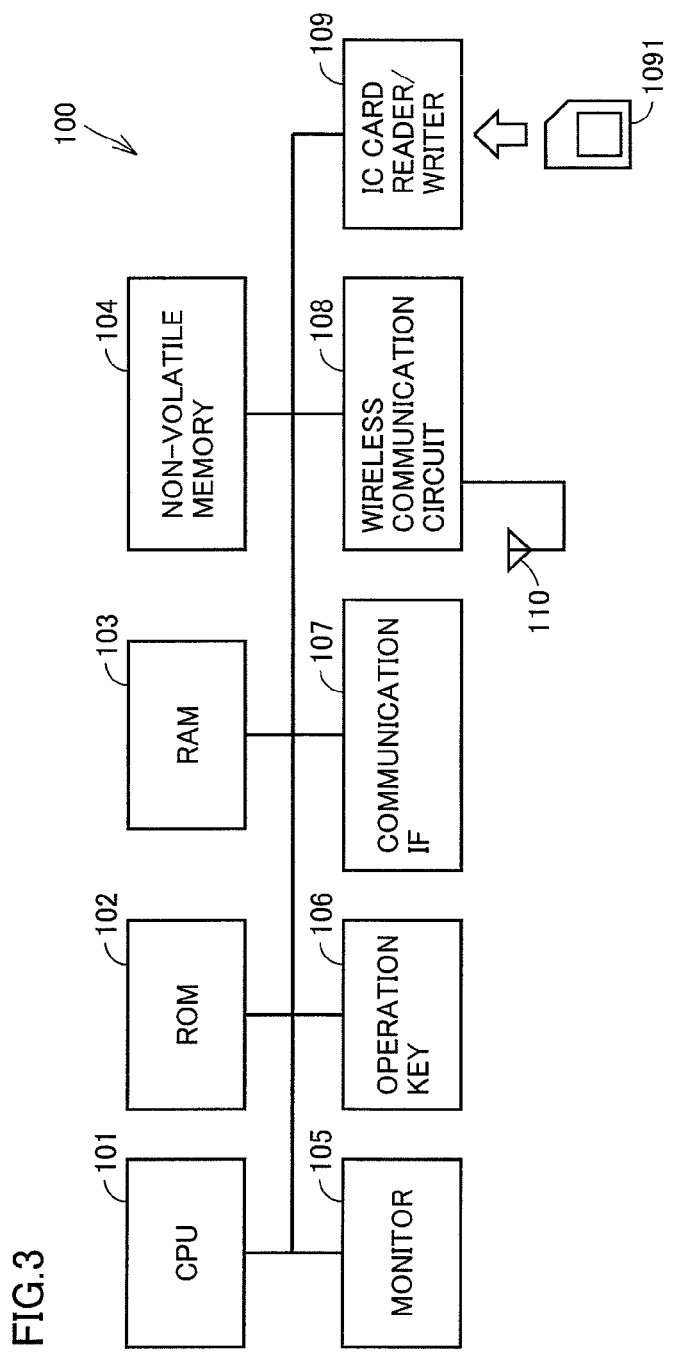
FIG. 3 is a diagram showing the hardware configuration of the control device.

FIG. 3 is a diagram showing the hardware configuration of control device 100. Referring to FIG. 3, control device 100 consists of main components including a CPU (Central Processing Unit) 101 executing a program, a ROM (Read Only Memory) 102 storing data in a non-volatile manner, a RAM (Random Access Memory) 103 storing data generated by execution of the program by CPU 101 or data input via an operation key 106 in a volatile manner, a non-volatile memory 104 storing data in a non-volatile manner, a monitor 105, an operation key 106, a communication IF (Interface) 107, a wireless communication circuit 108, an IC (Integrated Circuit) card reader/writer 109, and an antenna 110. Each component is connected with one another via a data bus. IC card reader/writer 109 is equipped with an IC card 1091.

Communication IF 107 is an interface for communicating with human detection sensors 310, 320, 330, and 340. Antenna 110 is connected to wireless communication circuit 108. Control device 100 wirelessly communicates with each device in the above-described user-premises device group via antenna 110 and wireless communication circuit 108.

The process in control device 100 is implemented by software executed by each hardware and CPU 101. Such software may be stored in non-volatile memory 104 in advance. Furthermore, software may be stored in IC card 1091 or other storage media, and may be distributed as a program product. Alternatively, software may be provided as a program product that can be downloaded by the information provider connected to the so-called Internet. Such software is read by IC card reader/writer 109 and other readers from its storage medium, or downloaded, for example, via a communication IF (not shown) or the like, and then, stored in non-volatile memory 104. This software is read from non-volatile memory 104 by CPU 101, and stored in RAM 103 in the form of an executable program. CPU 101 executes this program.

Each component constituting control device 100 shown in the figure is commonly used. Therefore, the essential part of the present invention can be recognized as software stored in RAM 103, non-volatile memory 104, IC card 1091 and other storage media, or software downloadable via a network. Since the operation of each hardware in control device 100 is well known, the detailed description thereof will not be repeated.

A recording medium is not limited to an IC card, but may be a medium fixedly carrying a program, such as a semiconductor memory including a DVD-ROM, a CD-ROM, an FD (Flexible Disk), a hard disk, a magnetic tape, a cassette tape, an optical disk (MO (Magnetic Optical Disc)/MD (Mini Disc)/DVD (Digital Versatile Disc)), an optical card, a mask ROM, an EPROM (Electronically Programmable Read-Only Memory), an EEPROM (Electronically Erasable Programmable Read-Only Memory), a flash ROM, or the like. Furthermore, the recording medium is a non-transitory medium from which the computer reads the above-described program or the like.

The program referred herein includes not only a program directly executable by a CPU but also a program in a source program form, a compressed program, an encrypted program, and the like.

In addition, control device 100 may include a touch panel display instead of monitor 105. In this case, the touch panel on the touch panel display serves as an input device as with operation key 106.

<Control Example 2 of Control Device 100>

Then, an explanation will be given with regard to a control example different from the control example that has been described with reference to FIG. 2. Specifically described will be a method of giving a priority to each of rooms 910, 920, 930, and 940 and determining the priority order in consideration of this priority. The following is an explanation of the details different from those explained with reference to FIG. 2. The same explanation as that given with reference to FIG. 2 will not be basically repeated.

(Data Structure)

FIG. 4 is a diagram showing basic device point information 22 stored in control device 100. Basic point information 22 is the information showing the control priority representing a degree for determining the control order of a plurality of devices included in the above-described user-premises device group (device priority information).

Referring to FIG. 2, in basic device point information 22, at least the basic point in the normal mode, the basic point in the visitor mode, and the room name (specifically, room identification information) are associated with each device (specifically, identification information of each device). Furthermore, in the normal mode, the basic point is associated with each device separately for the cases of human presence and human absence. As for air conditioners 222 and 242, the adjustment points during operation of the air conditioner are associated. The basic points are not associated with IH cooker 232 and refrigerator 233.

In this way, basic device point information 22 shown in FIG. 4 is different from device point information 29 shown in FIG. 2 in that the room identification information is associated with each device. Basic device point information 22 is identical to device point information 29 except that the room identification information is associated.

For example, since air cleaner 211 and lighting apparatus 212 are disposed in Japanese-style room 910, the identification information indicating Japanese-style room 910 is associated with each of air cleaner 211 and lighting apparatus 212. The room identification information may be stored in basic device point information 22, for example, by an input operation by the user.

Furthermore, in the case where power usage control system 1 is configured such that control device 100 communicates with the user-premises device group via each parent unit of the wireless LAN corresponding to each room, control device 100 may associate the IP address of the parent unit with the room identification information in advance, and thus, determine the room identification information of the device communicated via the parent unit based on the IP address of this parent unit. Furthermore, the IP address of the parent unit may be used as room identification information.

FIG. 5 is a diagram showing room information 23 stored in control device 100. Room information 23 is the room priority information showing the priority of each room in which a plurality of devices included in the above-described user-premises device group are disposed.

Referring to FIG. 5, in room information 23, the room point during human presence and the room point during human absence are associated with each room (specifically, the identification information of each room). In room information 23, the room point is stored as a negative value. The user inputs each point shown in room information 23 using operation key 106 such that the higher priority the room has, the greater the absolute value of the negative value is.

FIG. 6 is a diagram showing post-change device point information 24 stored in control device 100. Referring to FIG. 6, control device 100 generates post-change device point information 24 based on basic device point information 22 (see FIG. 4) and room information 23 (see FIG. 5).

In other words, control device 100 changes the value of the basic point in basic device point information 22 using the room point corresponding to the room identification information in basic device point information 22. Specifically, the room point during presence and the room point during absence are added to the basic point during presence and the basic point during absence, respectively, for each room. Since the room point is a negative value, the basic point is to be decreased by this addition.

As a result of this change, the basic point during presence and the basic point during absence in the normal mode vary from the basic point during presence and the basic point during absence, respectively, in the normal mode in FIG. 4 by the point shown as a room point. It is to be noted that IH cooker 232 and refrigerator 233 are not to be controlled as described above.

Control device 100 employs post-change device point information 24 to perform the process similar to that shown in "<Control Example 1 of Control Device 100>". Specifically, based on the control order in consideration of the room's priority, control device 100 determines the device to which an instruction to reduce the power usage is sent. Since the method of determining the device to which an instruction is sent is the same as the process described in "<Control Example 1 of Control Device 100>", the detailed description thereof will not be repeated.

Then, the visitor mode will be described. When the visitor is scheduled to come, the user uses operation key 106 to input the visitor information showing that a visitor is scheduled to come, and changes the operation of control device 100 from the normal mode to the visitor mode. When the operation mode is switched to the visitor mode, control device 100 determines the device to which an instruction to reduce the power usage is sent, not based on the basic point in the normal mode but based on the basic point in the visitor mode.

The manners of setting the basic point, the adjustment point during operation of the air conditioner in FIG. 4 and the room point in FIG. 5 are by way of example only, but not limited thereto.

For example, control device 100 may be configured such that the device receiving the instruction to reduce power usage is identified in ascending order of the basic points after change. In this case, control device 100 may be configured such that a point having a positive value is added as a room point from the basic point.

Furthermore, control device 100 may be configured such that the user inputs the basic point during presence in the normal mode and a correction point (not shown) for each device into control device 100. It may also be configured such that, when creating basic device point information 22 (see FIG. 4), control device 100 calculates the basic point during absence based on the basic point during presence and the correction point. Furthermore, room information 23 (see FIG. 5) may include the information of the room point for each device in the case where a visitor is scheduled to come.

Hereinafter described will be the specific configuration of control device 100 for implementing the above-described control with reference to FIG. 7.

(Functional Block)

Figure 7:
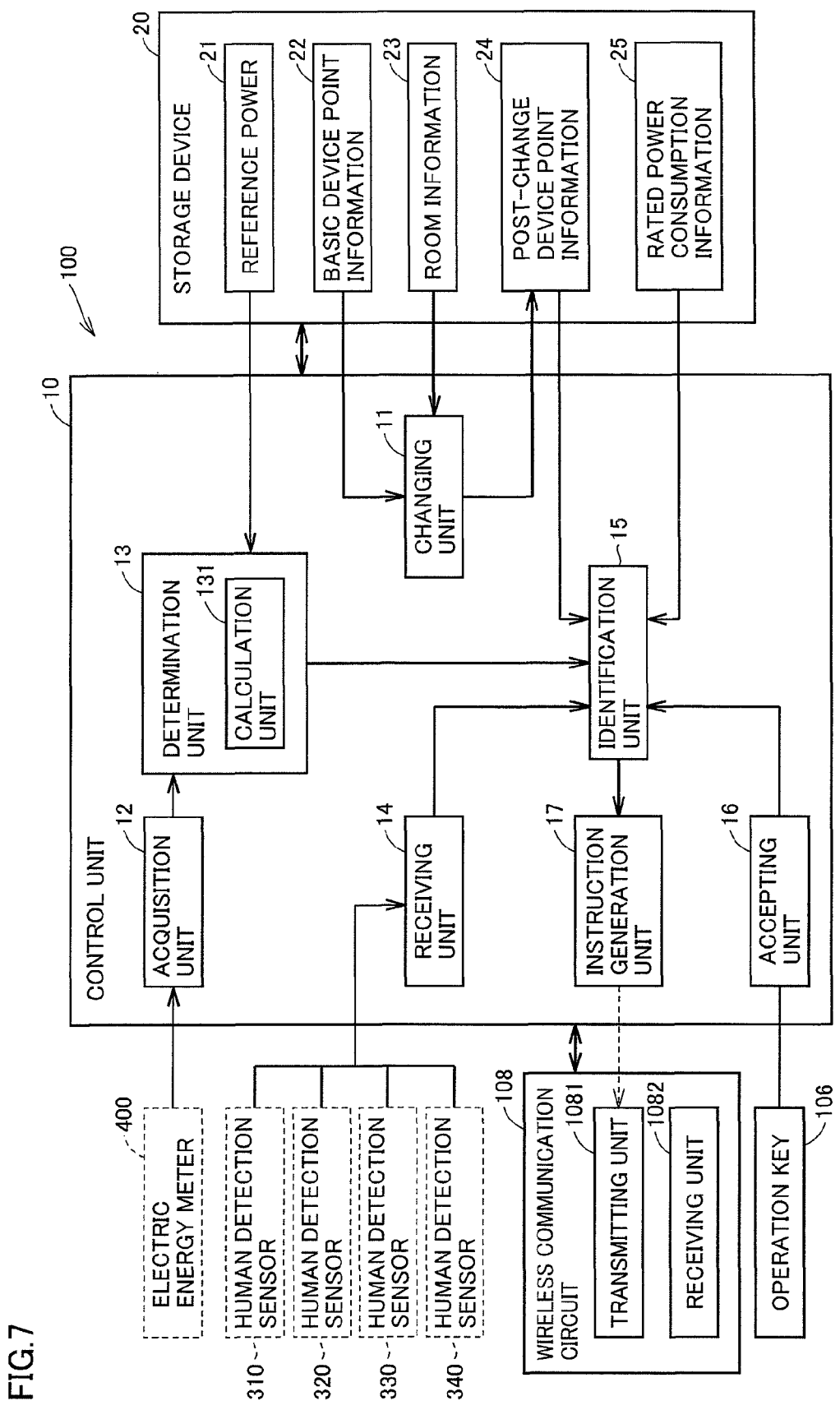
FIG. 7 is a functional block diagram showing the functional configuration of the control device.

FIG. 7 is mainly a functional block diagram showing the functional configuration of control device 100. Referring to FIG. 7, control device 100 includes at least a control unit 10, a storage device 20, an operation key 106, and a wireless communication circuit 108.

Control unit 10 includes a changing unit 11, an acquisition unit 12, a determination unit 13, a receiving unit 14, an identification unit 15, an accepting unit 16, and an instruction generation unit 17. Determination unit 13 includes a calculation unit 131. Wireless communication circuit 108 includes a transmitting unit 1081 and a receiving unit 1082.

Storage device 20 stores reference power 21, basic device point information 22 (device priority information), room information 23 (room priority information), post-change device point information 24 (information showing the control priority after change), and rated power consumption information 25 showing the rated power consumption of each device included in the user-premises device group.

Based on the room priority information, changing unit 11 changes the control priority representing a degree for determining the control order of the plurality of devices. In other words, changing unit 11 changes the basic point in basic device point information 22 (see FIG. 4) using the room point in room information 23 (see FIG. 5). Furthermore, changing unit 11 stores the order information after change in storage device 20 as post-change device point information 24 (see FIG. 6).

Acquisition unit 12 acquires power usage from electric energy meter 400. Acquisition unit 12 transmits the acquired power usage to determination unit 13.

Determination unit 13 reads reference power 21 from storage device 20. Determination unit 13 determines whether or not the power usage acquired by acquisition unit 12 has exceeded the reference power. Furthermore, calculation unit 131 included in determination unit 13 calculates the difference between this power usage and the reference power. When the above-described power usage has exceeded the reference power, determination unit 13 transmits, to identification unit 15, the above-described difference and the information showing that the power usage has exceeded the reference power.

From human detection sensors 310, 320, 330, and 340, receiving unit 14 receives the presence status information showing the status of human presence in each room. Receiving unit 14 transmits the presence status information about each room to identification unit 15.

Via operation key 106, accepting unit 16 accepts the input showing whether or not a visitor is scheduled to come. When accepting the input showing that a visitor is scheduled to come, accepting unit 16 transmits, to identification unit 15, the information showing that a visitor is scheduled to come.

In response to reception from determination unit 13 of the above-described difference and the information showing that the power usage has exceeded the reference power, identification unit 15 reads rated power consumption information 25 from storage device 20. When the power usage has exceeded the reference power, identification unit 15 identifies at least one or more devices to which an instruction to reduce the power usage is transmitted, based on post-change device point information 24, the above-described difference and the above-described rated power consumption information 25.

Instruction generation unit 17 generates the above-described instruction for each device identified by identification unit 15.

Transmitting unit 1081 of wireless communication circuit 108 transmits the instruction generated in instruction generation unit 17 to the device identified as described above. Specifically, based on the determination that the power usage has exceeded the reference power, transmitting unit 1081 transmits, to a device of the plurality of devices included in the user-premises device group that is relatively high in control priority after change, an instruction to reduce the power usage of this device.

As described above, in power usage control system 1 provided with control device 100, the user sets the room point of the room information, thereby allowing the power usage in the user's premises to be limited in consideration of the room's priority. Control device 100 will be hereinafter described in greater detail.

(1) Basic device point information 22 includes a basic point during human presence that represents a degree for determining the control order in the case where a human is present in the room having the devices disposed therein (control priority during presence), and a basic point during human absence that represents a degree for determining the control order in the case where a human is absent in the room (control priority during absence) (see FIG. 4). Changing unit 11 changes the control priority during presence and the control priority during absence based on room information 23 (see FIG. 6).

When the presence status information shows that a human is present in the room, identification unit 15 identifies the device to which the above-described instruction is transmitted, based on the control priority obtained after changing the above-described control priority during presence by changing unit 11. On the other hand, when the presence status information shows that a human is not present in the room, identification unit 15 identifies the device to which the above-described instruction is transmitted, based on the control priority obtained after changing the above-described control priority during absence by changing unit 11.

Thus, the control priority can be set separately in the case where a human is present and the case where a human is absent. In addition, each control priority can be changed based on the room's priority.

Accordingly, control device 100 can limit the power usage in the user's premises in consideration of the room's priority and also can perform appropriate control in accordance with presence or absence of a human in each room.

(2) Basic device point information 22 includes a basic point showing the control order in the case where a visitor is scheduled to come (control priority for visitor presence). Changing unit 11 changes the control priority for visitor presence based on room information 23. When accepting unit 16 accepts an input of the visitor information showing that a visitor is scheduled to come, identification unit 15 identifies the device to which the above-described instruction is transmitted, based on the control priority obtained after changing the control priority for visitor presence by changing unit 11.

Thus, when a visitor is scheduled to come, control device 100 can perform control suitable to the state of visitor presence.

(3) Room information 23 includes a room point during human presence showing the priority in the case where a human is present in the room (priority information during presence), and a room point during human absence showing the priority in the case where a human is absent in the room (priority information during absence) (see FIG. 5).

Changing unit 11 changes the basic point during human presence that represents a degree for determining the control order in the case of human presence in the room (control priority during presence) using the priority information during presence, and changes the basic point during human absence that represents the control order in case of human absence in the room (control priority during absence) using the priority information during absence.

When the presence status information shows that a human is present in the room, identification unit 15 identifies the device to which the above-described instruction is transmitted, based on the control priority changed by changing unit 11 using the above-described priority information during presence. Furthermore, when the presence status information shows that a human is absent in the room, identification unit 15 identifies the device to which the above-described information is transmitted, based on the control priority changed by changing unit 11 using the above-described priority information during absence.

The above-described configuration causes a difference in control priority between the state of human presence and the state of human absence and also causes a difference in room's priority between the state of human presence and the state of human absence.

Therefore, control device 100 can perform control that is more delicate and suitable to the user's preference, as compared with the case where the control priority is set separately in the case of human presence and in the case of human absence without setting the room's priority separately in the case of human presence and in the case of human absence.

(4) Receiving unit 1082 of wireless communication circuit 108 receives, from air conditioners 222 and 242, the setting condition information showing the setting condition of the room having the air conditioner installed therein and the environmental information showing the environment of the room under this setting condition. The setting condition information includes the information of the setting temperature. The environmental information at least includes the information of the room temperature showing the room temperature. It is to be noted that the environmental information may include, for example, the information of humidity, in addition to the information of the room temperature.

Based on room information 23, the above-described setting condition information and the above-described environmental information, changing unit 11 changes the control priority representing a degree for determining the control order of the plurality of devices included in the user-premises device group.

Therefore, in consideration of the gap between the setting condition and the room's environment, control device 100 can identify the device that is to be subjected to reduction in power usage. For example, it is more readily to give an instruction to reduce the power usage to the air conditioner having only a relatively small gap (for example, approximately 1 degree between the setting temperature and the room temperature) than to the air conditioner having a relatively large gap (for example, 5 degrees or more between the setting temperature and the room temperature). For example, in the case where the value of the basic point in post-change device point information is the same between two air conditioners, control device 100 transmits an instruction to reduce the power usage to the air conditioner having a relatively small gap between the setting condition and the environment.

<Control Structure>

Figure 8:
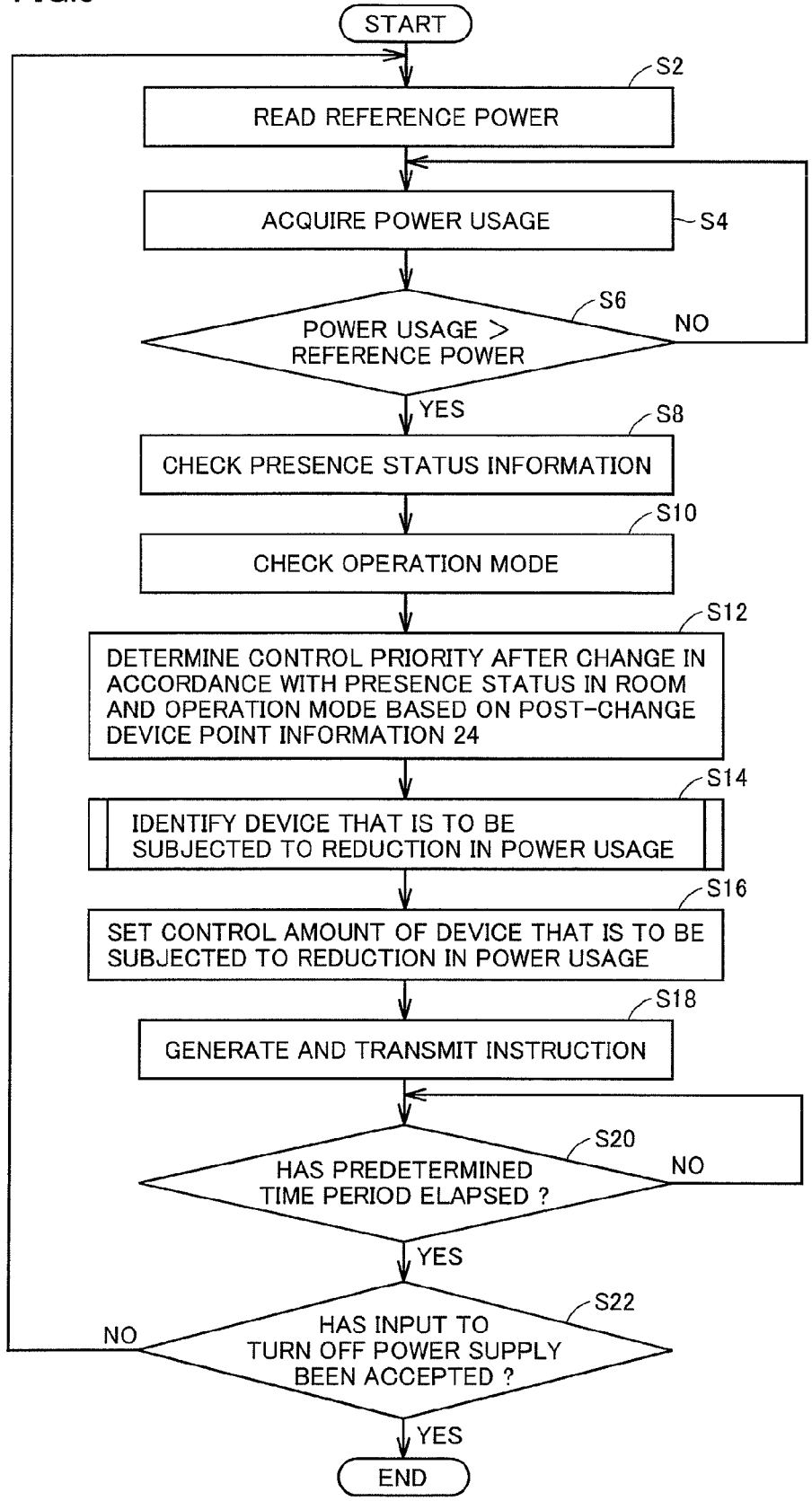
FIG. 8 is a flowchart illustrating a flow of the process by the control device.

FIG. 8 is a flowchart illustrating the flow of the process by control device 100. Referring to FIG. 8, in step S2, control device 100 reads reference power 21 from storage device 20. In step S4, control device 100 acquires power usage from electric energy meter 400. In step S6, control device 100 determines whether or not the acquired power usage is greater than reference power 21.

When control device 100 determines that the power usage is greater than reference power 21 (YES in step S6), control device 100 checks the presence status information received from human detection sensors 310, 320, 330, and 340 in step S8. When control device 100 determines that the power usage is not greater than reference power 21 (NO in step S6), the process is returned to step S4.

In step S10, control device 100 checks whether or not the current operation mode is the normal mode or the visitor mode. In step S12, based on post-change device point information 24, control device 100 determines the control priority changed in accordance with the presence status and the operation mode.

In step S14, control device 100 identifies the device of the plurality of devices included in the user-premises device group that is to be subjected to reduction in power usage. In step S16, control device 100 sets the control amount of the device that is to be subjected to reduction in power usage. In step S18, control device 100 generates an instruction to reduce power usage for the identified device and transmits this generated instruction to the identified device.

In step S20, control device 100 determines whether or not a predetermined time period has elapsed. When control device 100 determines that the predetermined time period has elapsed (YES in step S20), it determines in step S22 whether or not an input to turn off the power supply has been accepted. When control device 100 determines that the predetermined time period has not elapsed (NO in step S20), the process is returned to step S20.

When control device 100 determines that the input to turn off the power supply has been accepted (YES in step S22), it end a series of processes. When control device 100 determines that the input to turn off the power supply has not been accepted (NO in step S22), the process proceeds to step S2.

Figure 9:
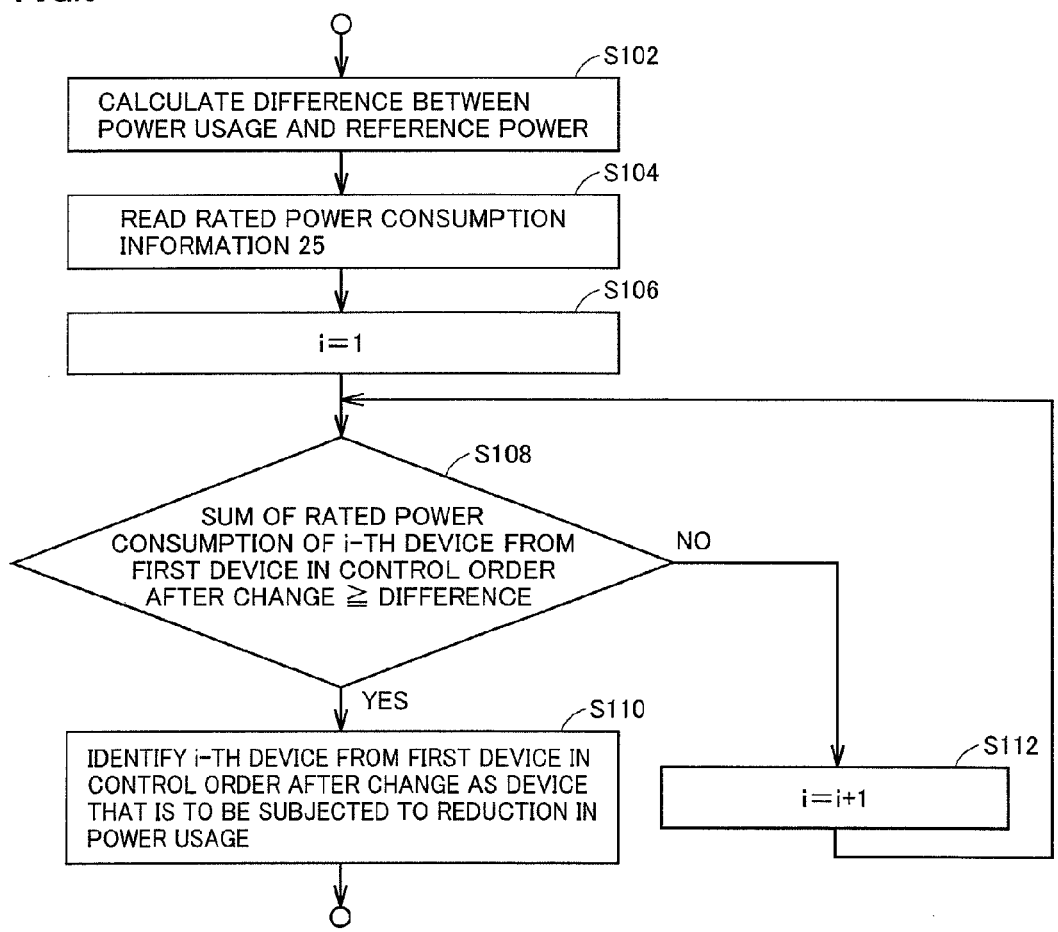
FIG. 9 is a flowchart illustrating details of the process shown in step S14 in FIG. 8.

FIG. 9 is a flowchart illustrating the details of the process shown in step S14 in FIG. 8. Referring to FIG. 9, in step S102, control device 100 calculates the difference between the power usage and reference power 21. In step S104, control device 100 reads rated power consumption information 25 from storage device 20. In step S106, control device 100 sets the value of a variable i at "1". The value of variable i is stored in storage device 20.

In step S108, control device 100 determines whether or not the sum of the rated power consumption of the i-th device from the first device in the control order of the control priority after change is greater than the calculated difference described above. When control device 100 determine that the sum is greater than the difference (YES in step S108), it identifies in step S110 that the i-th device from the first device in the control order of the control priority after change is a device that is to be subjected to reduction in power usage. When the control device determines that the sum is not greater than the difference (NO in step S108), it increases the value of variable i by 1 in step S112. After step S112, control device 100 proceeds the process to step S108. <<Modification>>

(1) In device point information 29 (see FIG. 2), the basic point during human presence, the basic point during human absence and the basic point for visitor presence are separately stored in advance. However, control device 100 is not limited to such a configuration, but may be configured such that the basic point during human absence and the basic point for visitor presence are calculated by an operation.

FIG. 10 is a diagram showing device point information 29A for obtaining the basic point during absence and the basic point for visitor presence by an operation. FIG. 10 also corresponds to FIG. 2.

Referring to FIG. 10, in device point information 29A, the basic point, the adjustment point during absence, the adjustment point for visitor presence, and the adjustment point during operation of the air conditioner are associated with each device (specifically, the device identification information). It is to be noted that FIG. 10 is identical to FIG. 2 in that the adjustment point during operation of the air conditioner is associated with the basic point.

Control device 100 adjusts the basic point using the adjustment point during absence or the adjustment point for visitor presence. For example, in the case where there is no one in the room where a lighting apparatus is installed, control device 100 sets the point for determining the control order of the lighting apparatus (the point after change) at "1700." Furthermore, when a visitor is scheduled to come, control device 100 sets the point for determining the control order of the lighting apparatus (the point after change) at "1100".

Such a configuration also allows power usage control system 1 to control the power usage of the user-premises device group to be not more than the reference power.

(2) In basic device point information 22 (see FIG. 4), the basic point during human presence, the basic point during human absence and the basic point for visitor presence are separately stored in advance. However, control device 100 is not limited to such a configuration, but may be configured such that the basic point during human absence and the basic point for visitor presence are calculated by an operation.

FIG. 11 is a diagram showing basic device point information 22A for obtaining the basic point during absence and the basic point for visitor presence by an operation. FIG. 11 also corresponds to FIG. 4.

Referring to FIG. 11, in basic device point information 22A, the basic point, the adjustment point during human absence, the adjustment point for visitor presence, the adjustment point during operation of the air conditioner, and the room name (specifically, the room identification information) are associated with each device (specifically, the device identification information). FIG. 11 is identical to FIG. 10 except that room names are associated with the basic points.

Figure 12:
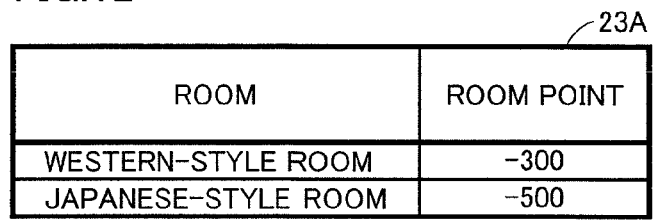
FIG. 12 is a diagram showing the room information stored in the control device.

FIG. 12 is a diagram showing room information 23A stored in control device 100. As with room information 23 (see FIG. 5), room information 23A represents the room priority information showing the priority of each room in which the plurality of devices included in the above-described user-premises device group are disposed.

Referring to FIG. 12, in room information 23A, the room point is associated with each room (specifically, the identification information of each room). In room information 23A, the room point is stored as a negative value. The user inputs each point shown in room information 23A via operation key 106 such that the higher priority the room has, the greater the absolute value of the negative value is.

FIG. 13 is a diagram showing post-change device point information 24A. Referring to FIG. 13, control device 100 generates post-change device point information 24A based on basic device point information 22A and room information 23A. In other words, control device 100 changes the values of the basic points in basic device point information 22A using the room point corresponding to the identification information of each room in basic device point information 22A. Specifically, the room point is added to the basic point for each device. Since the room point is a negative value, the basic point is to be decreased by this addition. The above-described change may result in the basic point that is different from the basic point in FIG. 11 by the points shown as a room point.

Such a configuration also allows power usage control system 1 to control the power usage of the user-premises device group to be not more than the reference power. Furthermore, power usage control system 1 identifies the device that is to be subjected to reduction in power usage in consideration of the room's priority, and also reduces the power usage of this device. Therefore, power usage control system 1 is excellent in convenience for a user as compared with the power usage control system without consideration of the room's priority.

Furthermore, it may also be recognized that control device 100 having such a configuration is configured such that changing unit 11 changes the control priority based on the room priority information and the information predetermined in accordance with the presence status information in the case where the presence status information shows that a human is present in the room.

According to the above-described configuration, control device 100 can limit the power usage in the user's premises in consideration of the room' priority and also can perform appropriate control in accordance with the state of presence or absence of a human in each room.

Furthermore, it may also be recognized that control device 100 is configured such that, when accepting an input of the visitor information showing that a visitor is scheduled to come, changing unit 11 changes the control priority based on the room priority information and the information predetermined in accordance with the visitor information.

According to the above-described configuration, in the case where a visitor is schedule to come, control device 100 can perform control suitable to the state of visitor presence.

(3) In the above description, storage device 20 stores rated power consumption information 25 showing the rated power consumption of each device, but may store the information showing the predetermined power consumption during the operation, in place of rated power consumption information 25. The power consumption is, for example, estimated power usage. The estimated power usage may be determined, for example, by a user based on the rated power consumption.

(4) In the above description, for example, air cleaner 211 stops the operation when it receives an instruction to reduce the power usage of air cleaner 211. However, power usage control system 1 may be configured to implement the energy saving operation not only by turning off the power supply of the device as described above but also by switching the current operation mode into the operation mode that is lower in power usage than the current operation mode.

According to the above-described configuration, for example, even when the power usage of the plurality of devices can be set to be not more than reference power 21 by turning off the power supply of the first device in the control order of the control priority after change, the power usage can be set to be not more than reference power 21 by operating the plurality of devices in a power saving manner that are higher in control order of the control priority after change.

(5) The embodiments disclosed herein are by way of example, but not limited only to the above-described description. The scope of the present invention is defined by the terms of the claims, and is intended to include any modifications within the scope and meaning equivalent to the terms of the claims.

REFERENCE SIGNS LIST 1 power usage control system, 10 control unit, 11 changing unit, 12 acquisition unit, 13 determination unit, 14 receiving unit, 15 identification unit, 16 accepting unit, 17 instruction generation unit, 20 storage device, 21 reference power, 22 basic device point information, 22 basic device point information, 22A basic device point information, 23 room information, 23A room information, 24 post-change device point information, 24A post-change device point information, 25 rated power consumption information, 29 device point information, 29 device point information, 100 control device, 101 CPU, 102 ROM, 103 RAM, 104 non-volatile memory, 105 monitor, 106 operation key, 107 communication IF, 108 wireless communication circuit, 109 card reader/writer, 110 antenna, 131 calculation unit, 211 air cleaner, 212 lighting apparatus, 221 television, 222 air conditioner, 223 lighting apparatus, 231 television, 232 cooker, 233 refrigerator, 234 lighting apparatus, 242 air conditioner, 243 lighting apparatus, 310 human detection sensor, 320 human detection sensor, 330 human detection sensor, 340 human detection sensor, 400 electric energy meter, 900 house, 910 Japanese-style room, 920 living room, 930 kitchen, 940 bedroom, 1081 transmitting unit, 1082 receiving unit.

The invention claimed is:

1. A control device controlling an operation of each of a plurality of devices connected to house wiring, said control device comprising:
   a storage device storing reference power, device priority information showing a control priority representing a degree for determining a control order of said plurality of devices and room priority information showing a priority of each room in which said plurality of devices are disposed;

an acquisition unit acquiring power usage of said plurality of devices;

a changing unit changing said control priority based on said room priority information;

a determination unit determining whether or not said acquired power usage has exceeded said reference power; and a transmitting unit transmitting, to a device of said plurality of devices, an instruction to reduce the power usage of the device, based on determination that said acquired power usage has exceeded said reference power, wherein the control priority of the device is higher relative to another device within the plurality of devices.

2. The control device according to claim 1, wherein said storage device further stores power consumption information showing predetermined power consumption during an operation for each of said devices, said determination unit includes a calculation unit calculating a difference between said acquired power usage and said reference power, and said control device further includes an identification unit identifying at least one or more devices to which said instruction is transmitted, based on said control priority after change, said difference and said power consumption information, when said acquired power usage has exceeded said reference power, and a generation unit generating said instruction for each said identified device.

3. The control device according to claim 2, further comprising a first receiving unit receiving presence status information showing a status of human presence in each room from a human detection sensor disposed in said each room, wherein said control priority includes a control priority during presence representing a degree for determining said control order in a case where a human is present in the room in which the devices are disposed, and a control priority during absence representing a degree for determining said control order in a case where a human is absent in the room, said changing unit changes said control priority during presence and said control priority during absence based on said room priority information, when said presence status information shows presence of a human in the room, said identification unit identifies the device to which said instruction is transmitted, based on the control priority obtained after changing said control priority during presence by said changing unit, and when said presence status information shows absence of a human in the room, said identification unit identifies the device to which said instruction is transmitted, based on the control priority obtained after changing said control priority during absence by said changing unit.

4. The control device according to claim 3, further comprising an accepting unit accepting an input of visitor information showing that a visitor is scheduled to come, wherein said control priority further includes a control priority for visitor presence representing a degree for determining said control order in a case where a visitor is scheduled to come, said changing unit changes said control priority for visitor presence based on said room priority information, and when said accepting unit accepts the input of said visitor information, said identification unit identifies the device to which said instruction is transmitted, based on the control priority obtained after changing said control priority for visitor presence by said changing unit.

5. The control device according to claim 3, wherein said room priority information includes priority information during presence showing said priority in a case where a human is present in said room, and priority information during absence showing said priority in a case where a human is absent in the room, said changing unit changes said control priority during presence using said priority information during presence, and changes said control priority during absence using said priority information during absence, when said presence status information shows presence of a human in the room, said identification unit identifies the device to which said instruction is transmitted, based on the control priority changed using said priority information during presence, and when said presence status information shows absence of a human in the room, said identification unit identifies the device to which said instruction is transmitted, based on the control priority changed using said priority information during absence.

6. The control device according to claim 1, further comprising a first receiving unit receiving presence status information showing a status of human presence in each room from a human detection sensor disposed in said each room, wherein when said presence status information shows presence of a human in said room, said changing unit changes said control priority based on said room priority information and information predetermined in accordance with said presence status information.

7. The control device according to claim 6, further comprising an accepting unit accepting an input of visitor information showing that a visitor is scheduled to come, wherein when said input showing that a visitor is scheduled to come is accepted, said changing unit changes said control priority based on said room priority information and information predetermined in accordance with said visitor information.

8. The control device according to claim 1, wherein at least one of said plurality of devices is an air conditioner, said control device further includes a second receiving unit receiving setting condition information showing a setting condition of a room in which the air conditioner is installed, and environmental information showing an environment of the room under said setting condition, and said changing unit changes said control priority based on said room priority information, said setting condition information and said environmental information.

9. A power usage control system including a control device controlling an operation of each of a plurality of devices connected to house wiring, and the plurality of devices, said control device comprising:

a storage device storing reference power, device priority information showing a control priority representing a degree for determining a control order of said plurality of devices, and room priority information showing a priority of each room in which said plurality of devices are disposed;

an acquisition unit acquiring power usage of said plurality of devices;

a changing unit changing said control priority based on said room priority information;

a determination unit determining whether or not said acquired power usage has exceeded said reference power; and a transmitting unit transmitting, to a device of said plurality of devices, an to reduce the power usage of the device, based on determination that said acquired power usage has exceeded said reference power, wherein the control priority of the device is higher relative to another device within the plurality of devices, in response to reception of said instruction, said plurality of devices each performing an operation based on said instruction.

10. A control method for a control device for controlling an operation of each of a plurality of devices connected to house wiring, said control method comprising the steps of:

a processor of said control device storing, in a memory of said control device, reference power, device priority information showing a control priority representing a degree for determining a control order of said plurality of devices and room priority information showing a priority of each room in which said plurality of devices are disposed;

said processor acquiring power usage of said plurality of devices;

said processor changing said control priority based on said room priority information;

said processor determining whether or not said acquired power usage has exceeded said reference power; and said processor transmitting, to a device of said plurality of devices, an instruction to reduce the power usage of the device, based on determination that said acquired power usage has exceeded said reference power, wherein the control priority of the device is higher relative to another device within the plurality of devices

* * * * *